United States Patent
Urzi et al.

(10) Patent No.: US 9,419,952 B2
(45) Date of Patent: Aug. 16, 2016

(54) MEMORY ENCRYPTION METHOD COMPATIBLE WITH A MEMORY INTERLEAVED SYSTEM AND CORRESPONDING SYSTEM

(71) Applicants: STMICROELECTRONICS (GRENOBLE 2) SAS, Grenoble (FR); STMICROELECTRONICS INTERNATIONAL N.V., Amsterdam (NL)

(72) Inventors: Ignazio Antonino Urzi, Voreppe (FR); Asif Rashid Zargar, Greater Noida (IN)

(73) Assignees: STMICROELECTRONICS (GRENOBLE 2) SAS, Grenoble (FR); STMICROELECTRONICS INTERNATIONAL N.V., Amsterdam (NL)

( * ) Notice: Subject to any disclaimer, the term of this patent is extended or adjusted under 35 U.S.C. 154(b) by 0 days.

(21) Appl. No.: 14/645,688

(22) Filed: Mar. 12, 2015

(65) Prior Publication Data
US 2015/0358300 A1 Dec. 10, 2015

(30) Foreign Application Priority Data
Jun. 5, 2014 (FR) .................................... 14 55086

(51) Int. Cl.
- *H04L 29/06* (2006.01)
- *G06F 12/14* (2006.01)
- *G06F 21/72* (2013.01)
- *H04N 7/16* (2011.01)
- *H04L 9/06* (2006.01)

(52) U.S. Cl.
CPC ........ *H04L 63/0464* (2013.01); *G06F 12/1408* (2013.01); *G06F 21/72* (2013.01); *H04L 9/0618* (2013.01); *H04L 63/061* (2013.01); *H04N 7/162* (2013.01)

(58) Field of Classification Search
None
See application file for complete search history.

(56) References Cited

U.S. PATENT DOCUMENTS

| | | | | |
|---|---|---|---|---|
| 8,498,417 B1 * | 7/2013 | Harwood | .............. | H04L 63/062 380/277 |
| 2002/0168018 A1 * | 11/2002 | Scheuermann | .......... | H04B 1/40 375/285 |
| 2005/0248473 A1 * | 11/2005 | Kukla | ................. | H03M 13/271 341/50 |

(Continued)

FOREIGN PATENT DOCUMENTS

EP      1578051      9/2005

*Primary Examiner* — Farid Homayounmehr
*Assistant Examiner* — Maung Lwin
(74) *Attorney, Agent, or Firm* — Allen, Dyer, Doppelt, Milbrath & Gilchrist, P.A.

(57) ABSTRACT

A method for managing an operation of an encrypted global interleaved memory space physically implemented according to an interleaving addressing scheme in encrypted memory banks of a plurality of memories respectively belonging to a plurality of channels. The method includes providing each channel with a local address pointer configured to be incrementally moved along the global memory space each time the global memory space is addressed at the current address pointed by the pointer, and in an absence of movement of the local pointer of a channel during a time period, addressing the global memory space from the channel through the address interleaving with a specific transaction at the current address, and upon reception at the channel of the specific transaction having been initiated by the channel, re-encrypting data located at the current address with a new encryption key and incrementing the local address pointer to its next position.

10 Claims, 12 Drawing Sheets

(56) References Cited

U.S. PATENT DOCUMENTS

| | | | |
|---|---|---|---|
| 2006/0242429 A1 | 10/2006 | Holtzman et al. | |
| 2007/0124811 A1* | 5/2007 | Dellow | G06F 12/1408 726/9 |
| 2007/0180539 A1* | 8/2007 | Holtzman | G06F 21/72 726/34 |
| 2007/0220377 A1* | 9/2007 | Park | H03M 13/276 714/701 |
| 2008/0267411 A1* | 10/2008 | Peterka | H04L 9/0841 380/279 |
| 2008/0320209 A1* | 12/2008 | Lee | G06F 12/0246 711/103 |
| 2009/0248958 A1* | 10/2009 | Tzeng | G06F 12/08 711/103 |
| 2011/0255689 A1 | 10/2011 | Bolotov et al. | |
| 2012/0311239 A1* | 12/2012 | Debout | H04L 9/0894 711/103 |
| 2013/0117532 A1* | 5/2013 | Rabinovitch | G06F 12/0607 711/213 |
| 2013/0191648 A1* | 7/2013 | Bursell | H04L 9/08 713/189 |
| 2014/0082262 A1* | 3/2014 | Nachimuthu | G06F 12/00 711/103 |
| 2014/0164774 A1* | 6/2014 | Nord | G06F 21/602 713/171 |
| 2015/0161045 A1* | 6/2015 | Zuo | G06F 12/0607 711/157 |

* cited by examiner

| Key used | New | New | New | Old | Old | Old | | | | | | Old |
|---|---|---|---|---|---|---|---|---|---|---|---|---|
| Memory location | 0 | 1 | 2 | 3 | 4 | 5 | | | | | | N |

PNT points to location 3

FIG.6

| Key used | New | New | New | New | Old | Old | | | | | | Old |
|---|---|---|---|---|---|---|---|---|---|---|---|---|
| Memory location | 0 | 1 | 2 | 3 | 4 | 5 | | | | | | N |

PNT points to location 4

| Key used | Old | | | | | | | Old | Old | Old | New | New | New |
|---|---|---|---|---|---|---|---|---|---|---|---|---|---|
| Memory location | N | | | | - - - | | | 5 | 4 | 3 | 2 | 1 | 0 |

| New | New | New | New | Old | Old | ... | | | | Old | Key used |
|---|---|---|---|---|---|---|---|---|---|---|---|
| 0 | 1 | 2 | 3 | 4 | 5 | | | | | N | Memory location |

| New | New | New | Old | Old | Old | ... | | | | Old | Key used |
|---|---|---|---|---|---|---|---|---|---|---|---|
| 0 | 1 | 2 | 3 | 4 | 5 | | | | | N | Memory location |

| Key used | New | New | Old | Old | Old | Old | | Old | | | | Old |
|---|---|---|---|---|---|---|---|---|---|---|---|---|
| Memory location | 0 | 1 | 2 | 3 | 4 | 5 | | 3+M | | | | N |

100

150₁

MEMORY ENCRYPTION METHOD COMPATIBLE WITH A MEMORY INTERLEAVED SYSTEM AND CORRESPONDING SYSTEM

FIELD OF THE INVENTION

Embodiments relate to a memory interleaved system and more particularly to memory encryption of such system.

BACKGROUND

Particular but non-limitative applications of the embodiments are high bandwidth consuming applications, such as multimedia applications, for example, implemented in set-top boxes.

Consumer expectations are placing ever greater demands on the multimedia requirements of today's consumer electronic devices. Advanced graphical user interfaces drive the demand for Graphics Processor Unit (GPU) HD video demand for video acceleration. Full 1080p graphics and video (2D and 3D TV) is becoming a requirement on almost every consumer electronic device today. 4KP30 and 4KP60 video resolutions are also now available.

Such applications are implemented on System on Chips (SoCs) coupled to memories such as double data rate (DDR) memories, for example, or double rate synchronous dynamic random access memories (DDR SDRAM).

Those applications, which are quite high bandwidth consuming, lead to increases in the number of memory interfaces of System on Chips used in consumer markets.

It is, however, possible to offer a unified memory system even if multiple memory interfaces are physically presented in a System on Chip. This is achieved by interleaving traffic to handle the multiple memories interfaces. This is known by one skilled in the art as "address interleaving".

Address interleaving aims also at achieving load balancing among the different memory interfaces.

Further, in order to be compliant with the latest generation of security requirements, it may be desirable to encrypt sensitive data stored in external memories, such as secured code and compressed video, for example.

SUMMARY

Two possible approaches exist for handling multiple memory interfaces, which are explained below.

According to a first approach, only one single memory encryption system and only one memory controller handle multiple memory interfaces, and where address interleaving is handled in the single memory controller.

However, with this approach, the physical implementation on the SoC is not easy because the memory interfaces might not be close to each other. Further, there is no load balancing in the Network on Chip (NoC).

According to a second approach, there is one memory controller for each memory interface and the address interleaving is handled in the so-called Service Access Point of the Network on Chip (NoC SAP). This approach permits an easier physical implementation. Further, the load balancing is actually in the Network on Chip.

Embodiments are directed to this second approach. However, when one memory encryption is associated to each controller and each controller handles a single memory interface, some issues exist to make this approach compatible with address interleaving.

According to one embodiment, a memory encryption method is proposed, which is compatible with a memory interleaved system thereby solving the issues mentioned above.

According to another embodiment, a method is proposed for managing the operation of an encrypted global interleaved memory space (also called, for example, application address space) physically implemented according to an interleaving addressing scheme in encrypted memory banks of memories, for example DDR memories, respectively belonging to several channels.

The global interleaved memory space is addressable, for example, by at least one master element such as a decoder, of a System on Chip (SoC) with transactions (read or write requests for example) through an address interleaving for routing each transaction to the channel containing the physical memory location corresponding to the transaction address in accordance with the interleaving addressing scheme.

According to this embodiment, the method includes providing each channel with a local address pointer configured to be incrementally moved along the global memory space each time the global memory space is addressed, for example by said at least one master element, at the current address pointed by the pointer.

In the absence of movement of the local pointer of a channel during a time period, the method includes addressing the global memory space from the channel through the address interleaving with a specific transaction, also called "kicker" transaction, at the current address, and upon reception as the channel of the specific transaction having been initiated by the channel, re-encrypting data located at the current address with a new encryption key and incrementing the local address pointer to its next position.

It should be noted here that in the present specification, data may include a single data or a packet of several data.

The mechanism of using an address pointer, detecting the absence of movement of this pointer during a time period, and the re-encryption of the data located at the address pointed by the pointer with a new encryption key is a so-called "kicker" mechanism (read followed by write mechanism), which permits periodic key changes in order to increase a security level in case a memory location remains unwritten for too long. The kicker mechanism is well-known by one skilled in the art and has been in particular disclosed in EP 1578051.

According to an embodiment, because the address pointer is configured to be moved along the global memory space, the kicker mechanism works in the global memory space, i.e. the application address space, and the "kicker" transactions are routed through the address interleaving algorithm. The kicker mechanism performs accesses that fall into the address space seen by the memory of a channel connected to an encryptor/decryptor of that channel but also into the other address spaces.

This permits to render the re-encryption of data with a refreshed key compatible with address interleaving, in particular, when the global memory space includes memory regions assigned with regions identifications. This would have not been possible if kicker accesses would have been generated in the physical address space and not routed through address interleaving resulting, thus for example, in non consistent regions identifications.

Generally, the global memory space includes interleaved memory zones physically implemented in the memory banks according to the interleaving addresses scheme. The range of addresses of an interleaved memory zone may be equal to an address interleaving step, which can be programmable.

According to an embodiment, upon reception at the channel of a specific transaction (kicker transaction) having been initiated by a second channel, the method includes discarding the specific transaction and sending an error transaction to the second channel, and upon reception of the error transaction at the second channel, incrementing an address pointer of the second channel by the address interleaving step.

In other words, if the kicker traffic reaches a channel which initiated this kicker traffic, the address pointer of this channel is conventionally incremented, i.e. incremented by a unit step. But, if the kicker traffic having been initiated by a first channel, reaches a second channel, an error will be generated by that second channel and on detecting this error the address pointer of the first channel is implemented by the address interleaving step. In case of an error kicker (received by the first channel in response to the kicker transaction), a writing operation of data is not performed in the memory of this first channel and the encryption key is not refreshed.

According to an embodiment, the method may also include encrypting data to be stored within a memory bank and decrypting data to be read from a memory bank and upon reception at a channel of a specific transaction (kicker transaction) having been initiated by the channel, the method includes reading the data located at the current address and encrypted with a previous encryption key, decrypting the encrypted data with previous encryption key, selecting a new primary key, generating the new encryption key from at least the selected new primary key, re-encrypting the decrypted data with the new encryption key and rewriting the re-encrypted data at the current address.

When the global memory space includes memory regions covering one or more memory zones, the method further includes upon reception of a transaction addressing a memory region, assigning a region identification associated to the memory region and generating the new encryption key from at least the selected new key and the region identification. This new encryption key may be also further generated from the memory address.

According to another embodiment, a device is proposed having a communication medium, several channels having an input/output interface coupled to the communication medium, and an encrypted global interleaved memory space physically implemented according to an interleaving addressing scheme in encrypted memory banks of several memories respectively belonging to the several channels. The global memory space is addressable with transactions through an address interleaving for routing each transaction to the channel containing the physical memory location corresponding to the transaction address in accordance with the interleaving addressing scheme. Each channel further comprising a local processor including a local address pointer configured to be incrementally moved along the encrypted global interleaved memory space each time the global memory space is addressed at the current address pointed by the local address pointer and a local controller configured to, in absence of movement of the pointer during a time period, address the global memory space through the address interleaving with a specific transaction at the current address. Upon the reception at the channel input/output interface of the specific transaction having been initiated by the local controller, re-encrypting the data located at the current address with a new encryption key and increment the address pointer to its next position.

According to an embodiment, the device further comprises at least one master address decoder (for example a master Service Access Point) and local address decoders (for example local Service Access Points) respectively associated to the several channels, and each address decoder being coupled to the communication medium and configured to implement the address interleaving with the interleaving addressing scheme. The at least one master element is configured to address the global memory space with transactions through the at least one master address decoder, and the local controller of a channel being configured to, in absence of movement of the local address pointer of the channel during a time period, address the global memory space through the local address decoder associated to the channel with the specific transaction at the current address.

According to an embodiment, the global memory space includes interleaved memory zones physically implemented in the memory banks according to the interleaving addressing scheme. The range of addresses of an interleaved memory zone are equal to an address interleaving step, and upon reception at a channel input/output interface of a specific transaction having been initiated by another local controller of another local processor of another channel, the local controller of the channel is further configured to control discarding the specific transaction and send an error transaction to the another local controller. Upon reception of the error transaction, the another local controller is configured to increment the local address pointer of the another processor by the address interleaving step.

According to an embodiment, each channel further comprises a local encryptor/decryptor configured to encrypt data to be stored within a memory bank and to decrypt data to be read from a memory bank. The local controller is configured, upon reception at the channel input/output interface of a specific transaction having been initiated by the local controller, to select a new primary key, control reading the data located at the current address and encrypted with a previous encryption key, control the encryptor/decryptor for decrypting the encrypted data with the previous encryption key, generating the new encryption key from at least the selected new primary key and re-encrypting the decrypted data with the new encryption key, and control rewriting the re-encrypted data at the current address.

According to an embodiment, the global memory space includes memory regions covering one or more memory zones, each local processor further comprises an address filter configured, upon reception of a transaction addressing a memory region, to assign a region identification associated to the memory region, and the local encryptor/decryptor is configured to generate the new encryption key from at least the selected new key and the region identification.

The device may comprise a System on Chip having memory interfaces respectively coupled to the memories which are outside said System on Chip, and the communication medium being a Network on Chip.

BRIEF DESCRIPTION OF THE DRAWINGS

Other advantages and features of the embodiments will appear on examining the detailed description of embodiments, these being in no way limiting, and of the appended drawings in which.

DETAILED DESCRIPTION

Figure 1:
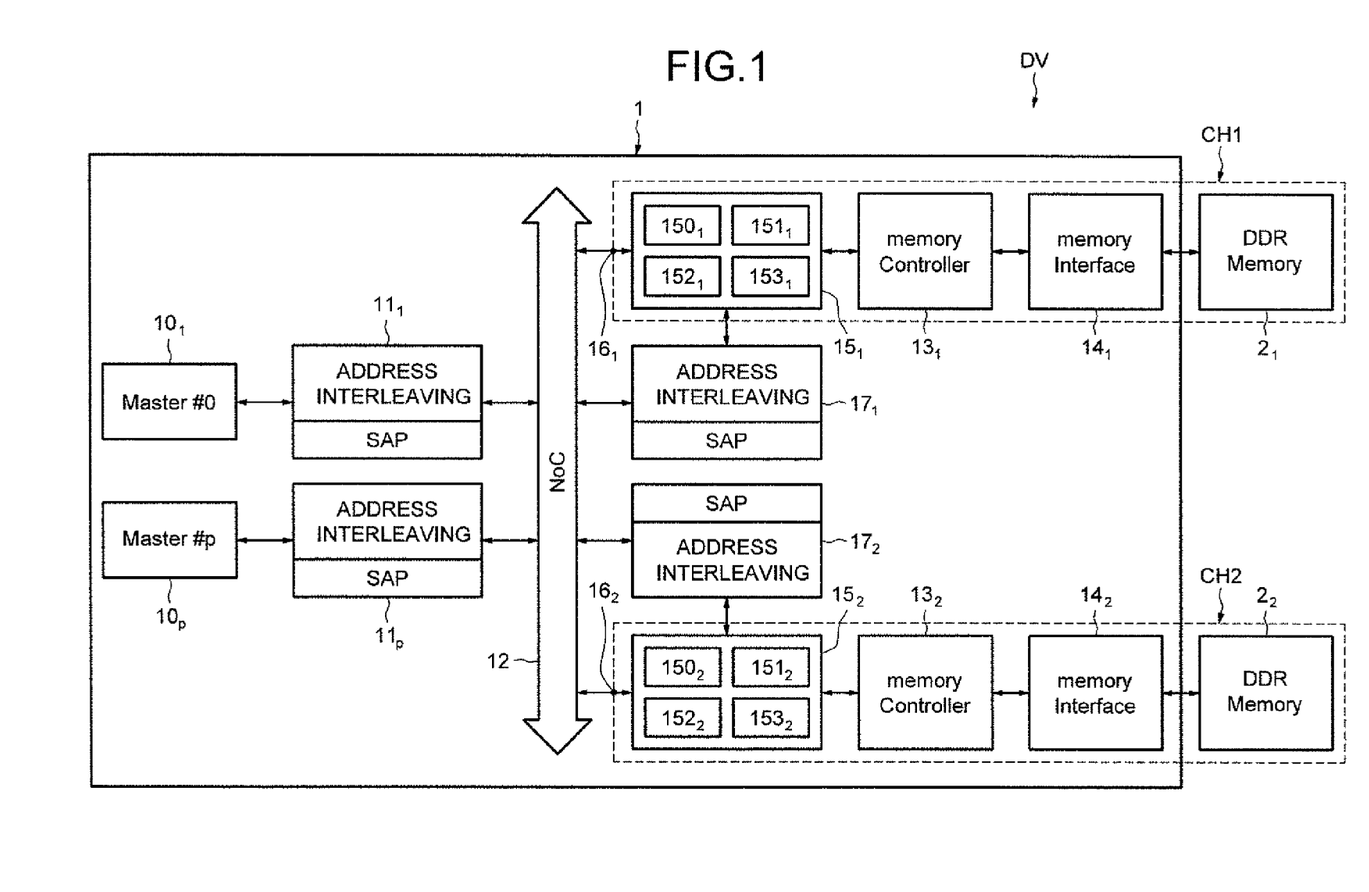
FIG. 1 is a block diagram of a System on Chip according to one embodiment.

Referring now to FIG. 1, reference DV is a device comprising a so-called System on Chip (SoC) 1 and several external memories, here DDR memories. In this example, only two memories $2_1$ and $2_2$ are represented.

The SoC 1 comprises a communication medium 12, here a Network on Chip (NoC) and several master elements 10, here P master elements, $10_1$-$10_P$. For example, master elements may be decoders.

Each master element $10_j$ is coupled to the communication medium 12 through a master service access point (SAP) referenced $11_j$.

Several channels, here two channels CH1, CH2, are coupled to the communication medium 12 through input/output means $16_1$, $16_2$, such as Target Network Interface (TNI).

Each channel $CH_i$ comprises a memory controller $13_i$ connected to a memory interface $14_i$ coupled to the corresponding external memory $2_i$.

Each channel $CH_i$ further comprises local processor $15_i$ including a local address pointer $150_i$, local controller $151_i$, encryptor/decryptor $152_i$ and address filter $153_i$. Functions of these elements will be detailed thereafter.

The local pointer may be implemented by a counter and the other components of the local processor may be implemented by logic circuits and/or software modules.

However, it can be already noted that the local address pointer $150_i$ and the local controller $151_i$ are configured to implement, in particular, a local "kicker" mechanism such as the one disclosed in the above-mentioned patent.

And, for the operation of this local kicker mechanism, the local controller $151_i$ is coupled to the communication medium 12 through a local service access point (SAP) referenced $17_i$.

Figure 2:
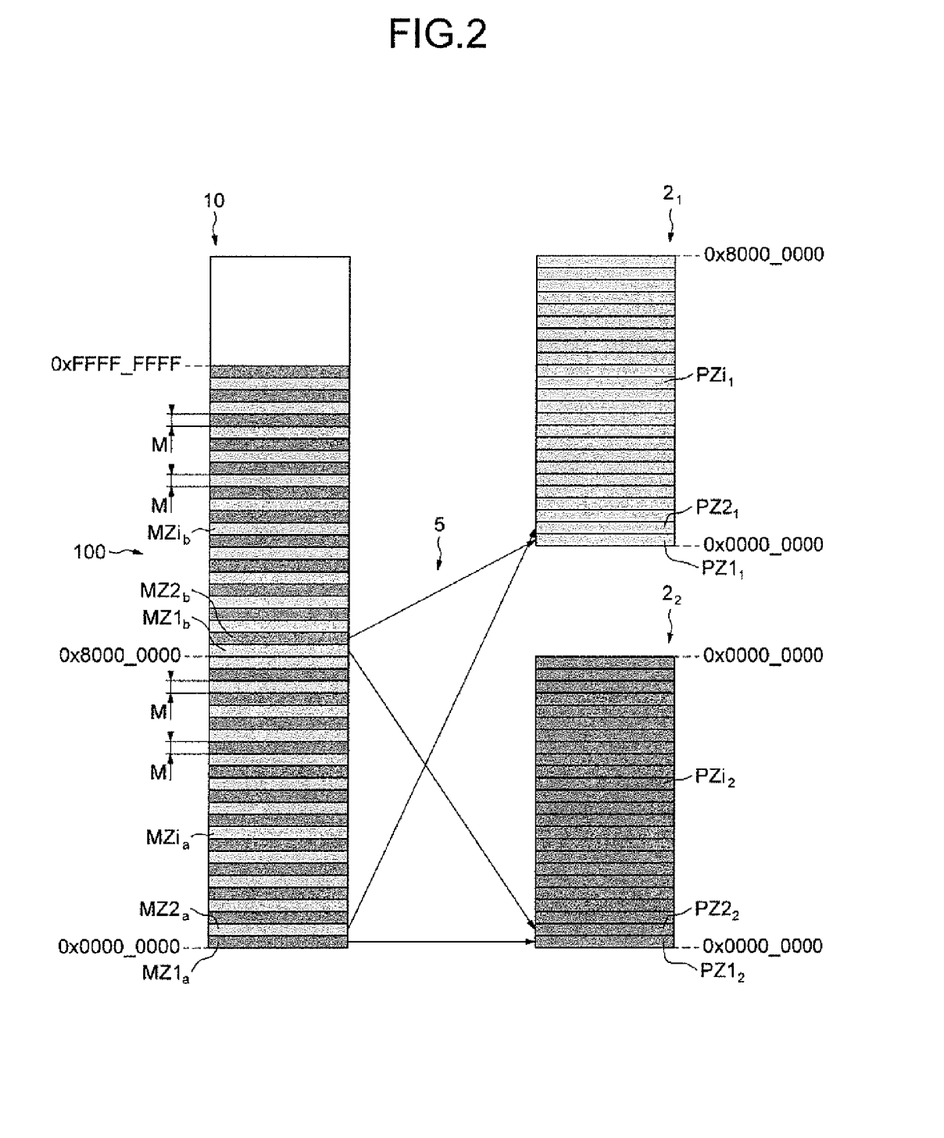
FIG. 2 illustrates an example of an interleaving addressing scheme.

As illustrated in particular in FIG. 2, each master element may have access to a global memory space 10 also called application addressing space or system addressing space. In the present example, the global memory space 10 comprises a global interleaved memory space 100 and a global non interleaved (linear) memory space 101. Although each master element sees this global memory space as a unified memory system, the global interleaved memory space 100 is physically implemented according to an interleaving addressing scheme 5 in memory banks of the external memories $2_i$.

This global interleaved memory space is an encrypted global interleaved memory space because data to be stored therein are encrypted.

More precisely, as it is well-known by the one skilled in the art, the global interleaved memory space 100 includes interleaved memory zone MZi. In the present example, the global memory space is addressable with more than 32 bits and the global interleaved memory space 100 is a 4 Gbytes memory space extending from address 0x0000_0000 until 0xFFFF_FFFF in hexadecimal notation.

Each physical addressing space implemented in the external memories $2_i$ is a 2 Gbytes memory space addressable with words of 31 bits from address 0x0000_0000 until 0x8000_0000.

The global interleaved memory space 100 includes here two groups of memory zones $MZi_a$ and $MZi_b$.

The first group $MZi_a$ includes the memory zones starting from address 0x0000_0000 until address 0x8000_0000 whereas the group $MZi_b$ includes memory zones starting from address 0x8000_0001 until address 0xFFFF_FFFF.

And, according to the address interleaving scheme 5, the first zone $MZ1_a$ of the first group is physically implemented in the first physical zone $PZ1_2$ of external memory $2_2$, the first memory zone $MZ1_b$ of the second group $MZi_b$ is physically implemented in the first physical zone $PZ1_1$ of the external memory $2_1$, the second memory zone $MZ2_a$ of the first group is physically implemented in the second physical zone $PZ2_1$ of the external memory $2_1$, the second memory zone $MZ2_b$ is physically implemented in the second physical zone $PZ2_2$ of the external memory $2_2$, and so on.

Each physical zone $PZ_i$ of each external memory may include one or more memory banks.

The addresses range of an interleaved memory zone $MZ_i$ is equal to an address interleaving step M.

In the present example, M is equal to FFFF in hexadecimal notation and, for example, the first memory zone $MZ1_a$ starts at address 0x0000_0000 until address 0x0000_FFFF, and the second memory zone $MZ2_a$ starts at address 0x0001_FFFF until address 0x0002_FFFF.

In some cases, the global interleaved memory space 100 may contain memory regions R0-R6 covering one of several memory zone MZi.

These regions are defined based on the application memory allocated in the external corresponding memory.

Different access rights may be assigned to each region. A filtering is performed by checking incoming memory transaction identifiers versus region access rights. The local address filter $153_i$ (FIG. 1) is configured, upon reception of a transaction addressing a memory region, to assign a region identification associated to this memory region.

These regions are defined in the global interleaved memory space (for example 35: addressing typically in case of more than 4 Gbytes global memory space).

Figure 3:
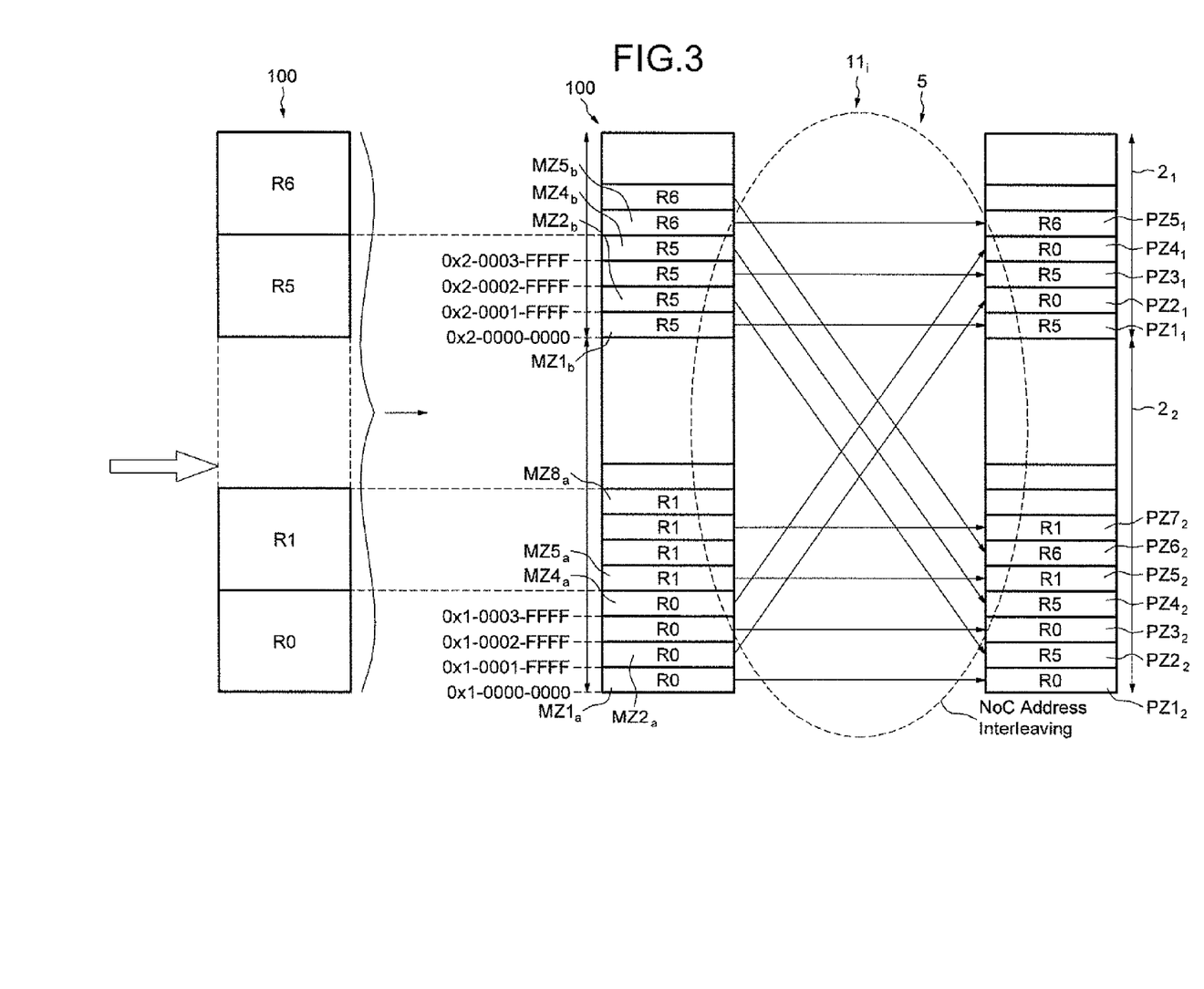
FIG. 3 is a diagram of memory zones physically implemented in external memories according to one embodiment.

As illustrated in FIG. 3, the different parts of a memory region covering several memory zones are physically implemented in external memories $2_1$ and $2_2$ according to the address interleaving scheme 5.

This address interleaving scheme is implemented in each master service access point $11_i$ and in each local service access point $17_i$. The service access point also called "Initiator Network Interface" (INI) implements address decoding function. Thus, such service access point is considered as being an address decoder. Address decoding is enhanced to detect transaction to an address in an interleaved memory zone or region and to route it accordingly.

Figure 4:
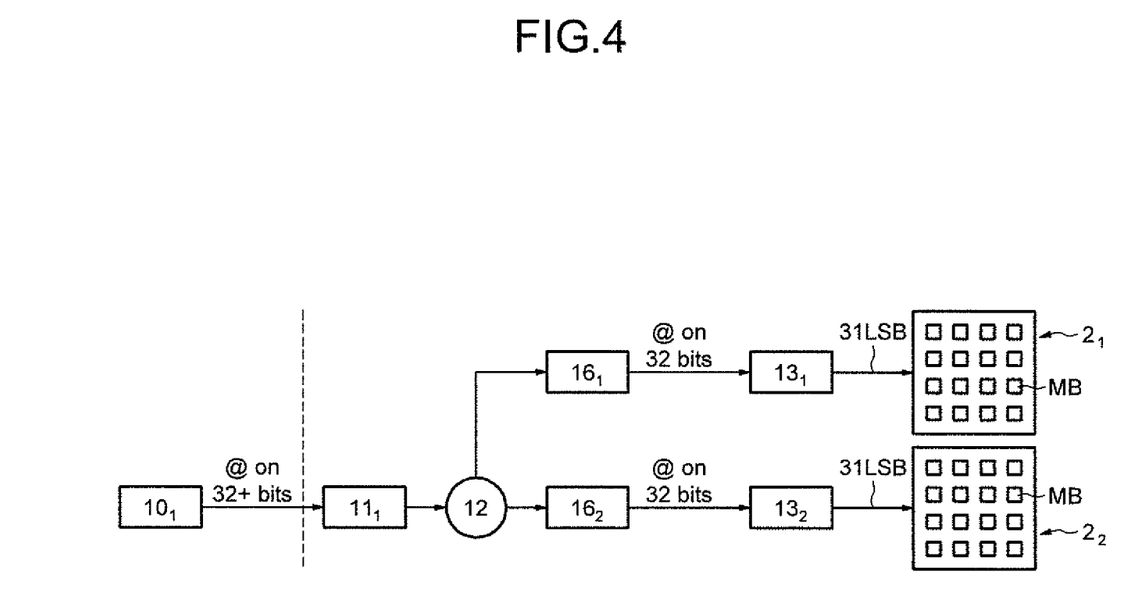
FIG. 4 is a diagram illustrating an Initiator Network Interface.

This is illustrated diagrammatically in FIG. 4. For example, the master element $10_1$ sends a transaction (read or write) with an address on more than 32 bits. The SAP or master address decoding means $11_1$ routes through the communication medium 12 this transaction either to target network interface $16_1$ or target network interface $16_2$ depending on the value of the MSB bits.

An address on 32 bits is then delivered to the corresponding controller $13_1$ or $13_2$ and only the 31 LSB bits are used to address the corresponding memory banks of the corresponding memory bank MB of the corresponding external memory.

As indicated above, in order to be compliant with the latest generation of security requirements, it is highly advisable to encrypt sensitive data stored in the external memories $2_i$. Encryptions keys are used by the encryptor/decryptor $152_i$ for encrypting such sensitive data to be stored in the corresponding external memory and to decrypt such sensitive data to be read from the corresponding external memory.

In order to increase the security level, it is preferable that encryption key changes. Such key changes can be naturally done by, for example, master element generated traffic or by the so-called kicker mechanism.

Some characteristics of such kicker mechanism will be now described with reference to FIGS. 5 and 6. However, for more details, the one skilled in the art may refer if necessary, to the above-mentioned patent.

The kicker mechanism (read followed by write) is responsible for periodic key changes in order to increase the security level in case a memory location remains unwritten for too long.

At any instant of time, two random keys (old and new) are being used by the encryptor/decryptor. Internally, a memory pointer is maintained which acts as a reference for key usage.

In case the pointer location is not written by system traffic (i.e., the master elements) for a time period called the "time out period," the kicker mechanism performs a read to this location with the old key, writes the data back with the new key thus guaranteeing the key change, and increments the pointer.

Once the complete memory is written by the new key, the old key is reloaded with new values from a random number generator and a key swap is done, i.e., the old key becomes the new key and the new key as the old key.

Figure 5:
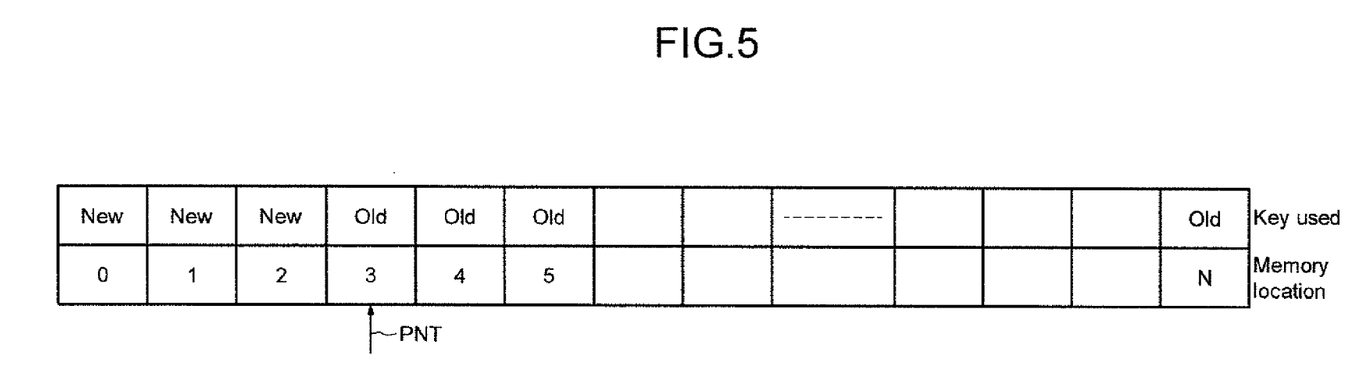
FIG. 5 is a diagram illustrating the refresh process before applying a kicker mechanism.
Figure 6:
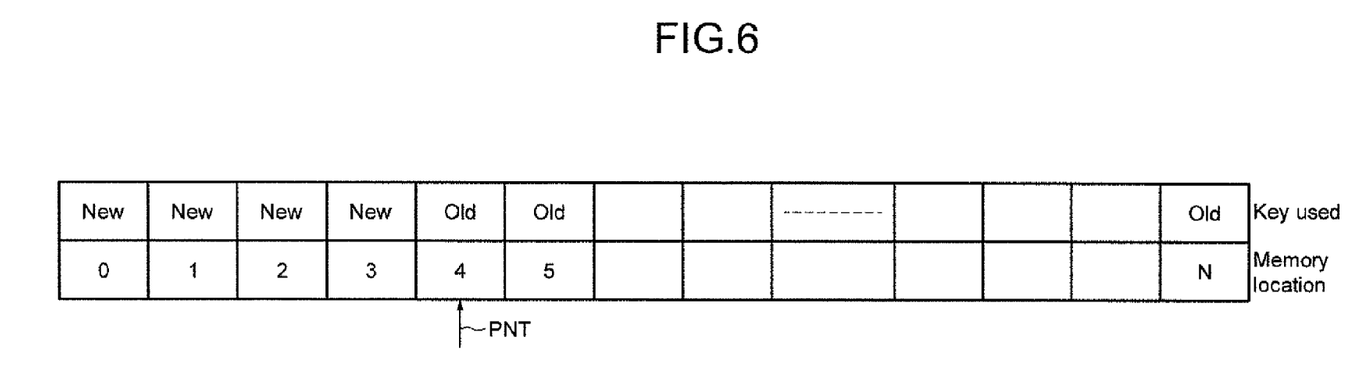
FIG. 6 is a diagram illustrating the refresh process after applying the kicker mechanism.

FIGS. 5 and 6 explain the key refresh process of kicker mechanism.

FIG. 5 is the situation before applying the kicker mechanism. With reference to FIG. 5, the kicker pointer PNT is assumed to point at the memory location having address 3.

For memory location having an address lower than 3, the read/write decryption/encryption operations are made with the new key, whereas the old keys are intended to be used for read/write decryption/encryption operations for memory locations having addresses greater than 3.

If the pointer PNT does not move during the time out period, the kicker process will perform read from location 3, the data being decrypted with the old key, and write data back in the same location 3 encrypted with the new key, and then increment pointer to location 4. This is illustrated in FIG. 6.

More precisely, after operation of this kicker mechanism, the kicker pointer PNT points now at location 4. Again, if the pointer does not move during the time out period, the kicker process will perform read from location 4 with the old key and write data back with the new key and increment the pointer to location 5.

Once the kicker pointer reaches location N, the old key is no longer useful and is replaced by a new random key generated, for example, from a random number generator and a key swap is done.

Thus, such kicker mechanism ensures that after periodic intervals, the keys used for decryption/encryption of the memory are changed.

As indicated above, the encrypted global interleaved memory space may be divided into different memory regions each having a region identification.

Figure 7:
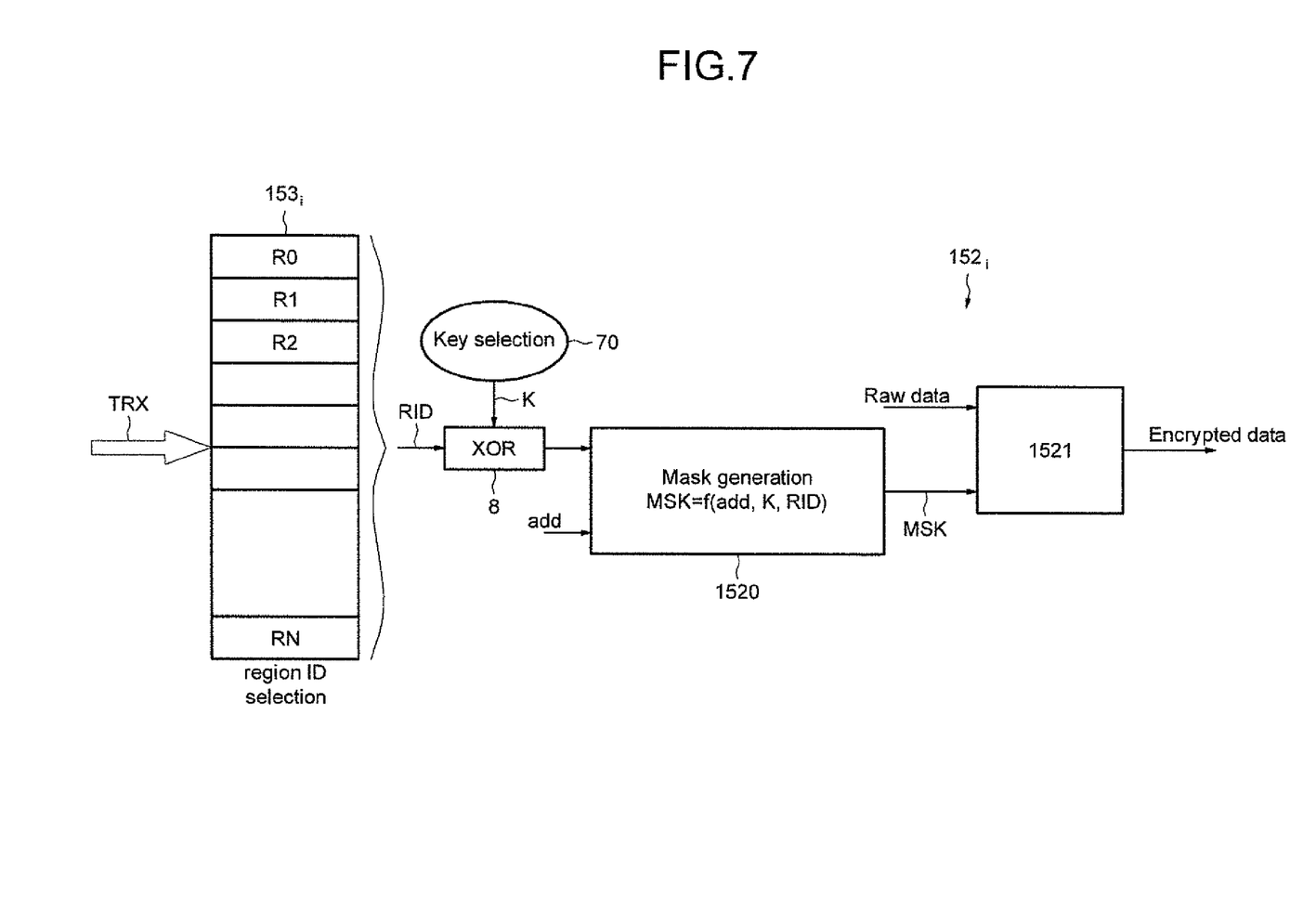
FIG. 7 is a block diagram of an address filter and encryptor/decryptor according to one embodiment.

As indicated above, these memory regions R0-RN are defined on the global interleaved memory space. As illustrated in FIG. 7, the address filter means $153_i$ are configured to generate the region identification RID from these memory regions. For example, if a transaction TRX, either initiated by one of the master elements or initiated by local control means during a kicker process, is directed to region 0, the region identification RID is equal to 0, if transaction TRX is directed to region 1, the region identification RID is 1 and so on.

As illustrated also in FIG. 7, the key used for encryption by the encryptor/decryptor $152_i$ is not only depending on the physical address add contained in the transaction TRX but also on the region identification RID.

The primary key K selected (step 70) by the local control means $151_i$ during a kicker mechanism, is also used for the encryption.

More precisely, as illustrated in FIG. 7, the new primary key K selected by the local controller and the region identification RID are delivered to a logic gate 8, for example XOR gate. The output of this gate 8 is delivered to mask generator 1520, which implements a secret function f. Another input of the mask generator 1520 is the address add contained in the transaction TRX.

Thus, a mask MSK is generated as a function of the new primary key K, the region identification RID and the address ADD.

This mask MSK acts as an encryption key for obfuscation algorithm 1521 such as for example DES algorithm or AES algorithm. The raw data are thus encrypted with the encryption key MSK and the obfuscation algorithm 1521 delivers encrypted data.

Figure 8:
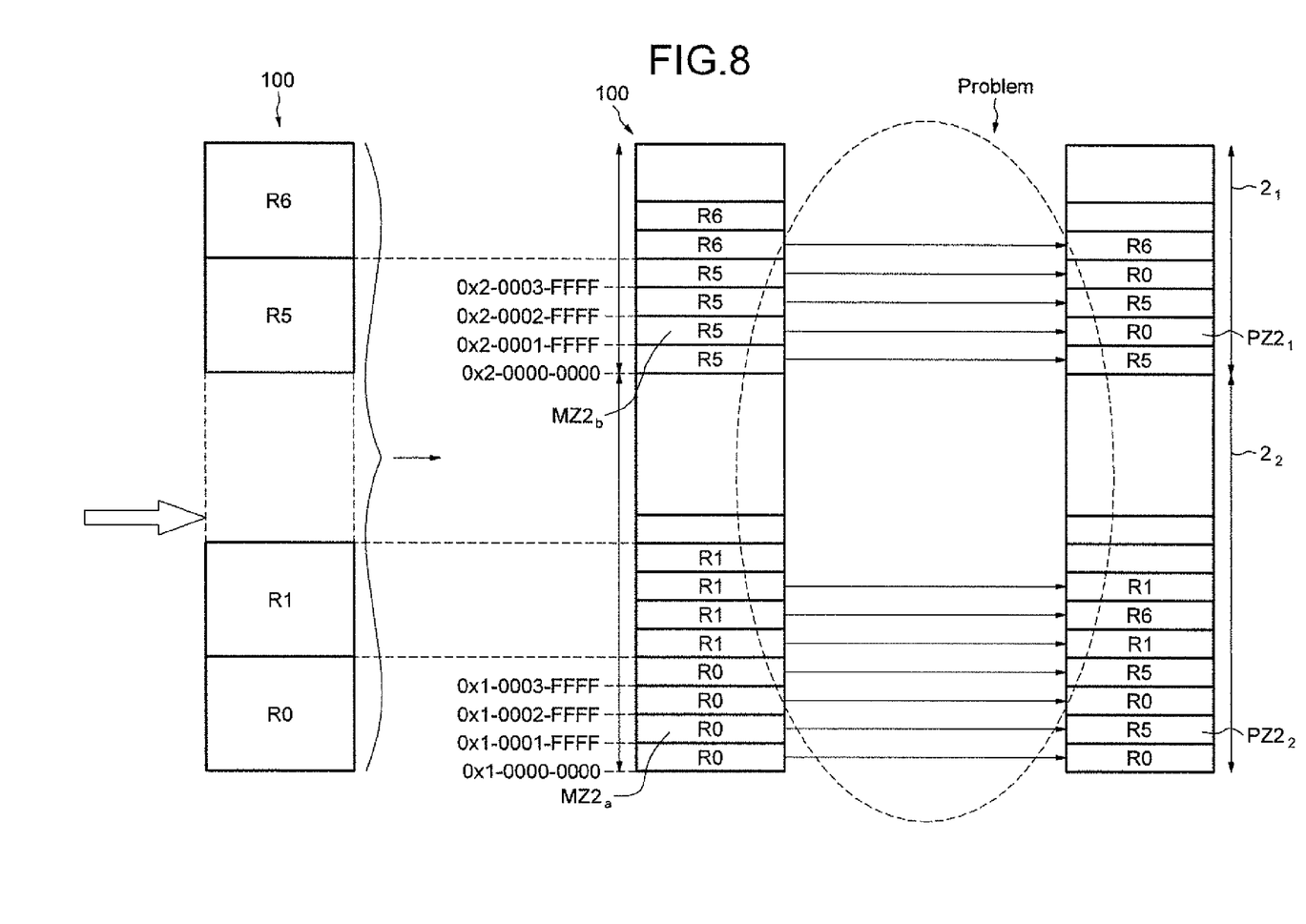
FIG. 8 illustrates a non-consistency in memory regions identifications.

Leaving the kicker mechanism working in the physical space of the external memories $2_i$ and the address filter in the global interleaved memory space would not work as diagrammatically illustrated in FIG. 8.

As a matter of fact, kicker accesses generated in the physical address space and not routed through the network on chip results in not consistent region identification RID versus region ID generated from transaction initiated by a master element.

As a matter of fact, for example, if we compare FIG. 3 and FIG. 8, we can see that whereas in FIG. 3, a transaction addressing the part of region 0 in memory zone $MZ2_a$ is routed to memory zone $PZ2_1$ of the external memory $2_1$, the same transaction initiated by kicker mechanism would be routed to the memory zone $PZ2_2$ of external memory $2_2$ (FIG. 8). However, as referring again to FIG. 3, such memory zone $PZ2_2$ relates to a part of region R5.

Thus, there is actually a non consistency of the region identification RID.

Thus, in order to preserve this consistency, a kicker transaction should be aware of the address interleaving 5.

In other words, a kicker traffic which reaches a particular channel should follow the addressing as the one implemented by the NoC address interleaving scheme 5.

A first solution would consist in implementing the NoC address interleaving scheme inside the memory controller of each channel.

Although such a solution is theoretically possible, it is practically too complex and risky because the generally high DDR frequency.

Thus, another solution is proposed which will be explained more in details with reference in particular to FIGS. 9-12.

More precisely, the kicker mechanism implemented in each local processor $15_i$ works in the global interleaved memory space.

This is equivalent to say that all the local processors sitting in the system on chip have view of the global interleaved memory space.

The kicker transactions are routed through the network on chip and more particularly through the local service access point $16_i$ that implement the address interleaving algorithm. This avoids replicating this algorithm into the local processors themselves.

Each kicker transaction is tagged with an identifier of the local controller that allows the local controller of the local processing of a channel to accept or discard incoming kicker transaction.

If the kicker traffic reaches the channel which initiated the kicker, the current pointer is incremented by a unit step. If the kicker traffic reaches another channel, the error will be generated by that another channel and on detecting this error within the channel which initiated the kicker, the current pointer of this channel is incremented by the address interleaving step size M.

A more precise example will be now described with reference to FIGS. 9-14.

Figure 9:
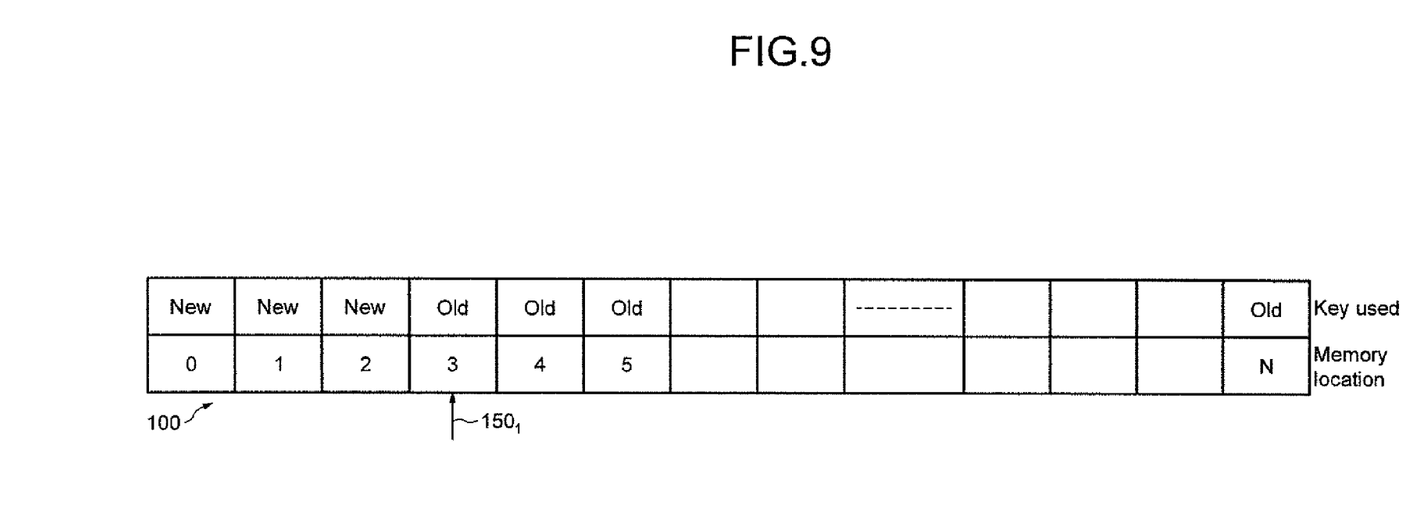
FIG. 9 is a diagram illustrating the local pointer pointing to a memory location of the global memory space.

Assuming on FIG. 9 that local pointer $150_1$ is pointing to memory location 3 of the global memory space 100 for a time period having exceeding the time out period. In such a case, the local controller $151_1$ sends (S100 FIG. 10) through service access point $16_1$ a kicker transaction Ktx at the address 3.

We assume also that such kicker transaction comes back to the local processor $15_1$ of channel 1.

Figure 10:
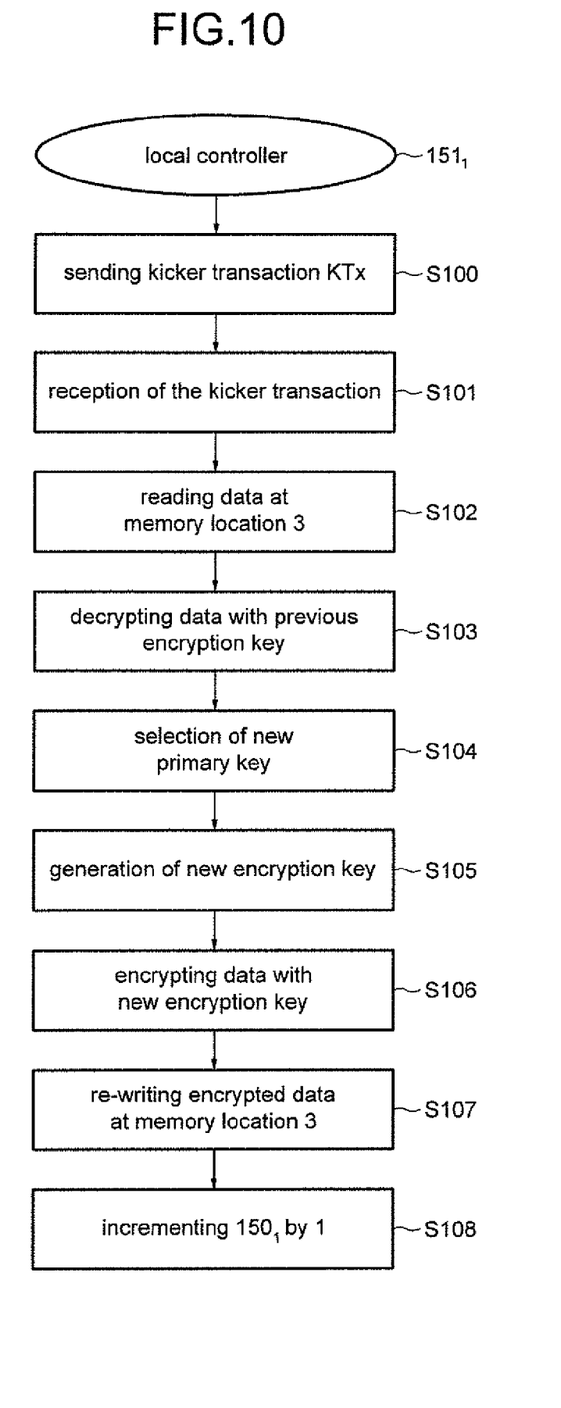
FIG. 10 is a flow diagram of sending a kicker transaction in an embodiment.
Figure 11:
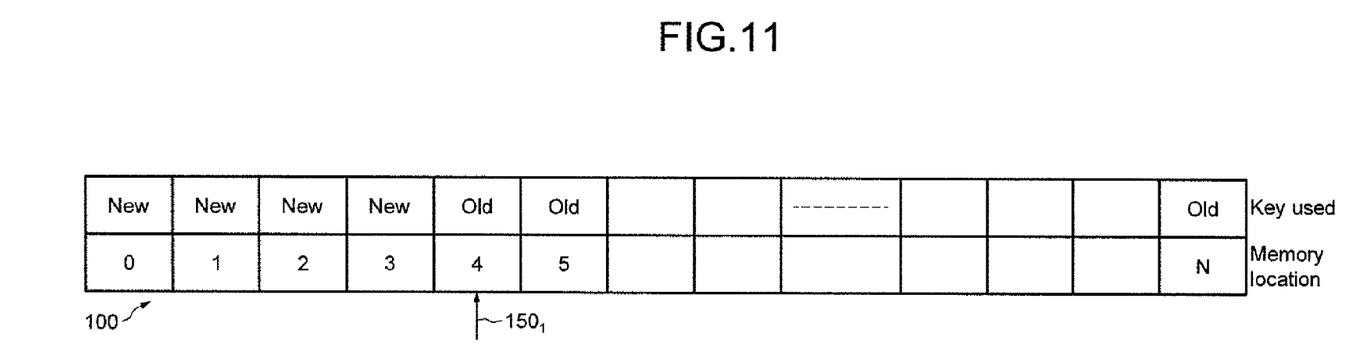
FIG. 11 is a diagram illustrating incrementing the local pointer to point at a different memory location of the global memory space shown in FIG. 9.

Upon reception S101 of the kicker transaction, having being initiating by controller $151_1$, the local controller $151_1$ reads (S102) the data located at address 3 and encrypted with the old encryption key. The encryptor/decryptor decrypts (S103) the encryption data with the previous encryption key. The local controller $151_1$ selects (S104) the new primary key and the encryptor/decryptor generates (S105) the new encryption key. The encryptor re-encrypts (S106) the decrypted data with the new encryption key and the local controller $151_1$ controls re-writing (S107) the re-encrypted data at memory location 3 and increments (S108) local address pointer $150_1$ so that it points to memory location 4 (FIG. 11).

Figure 12:
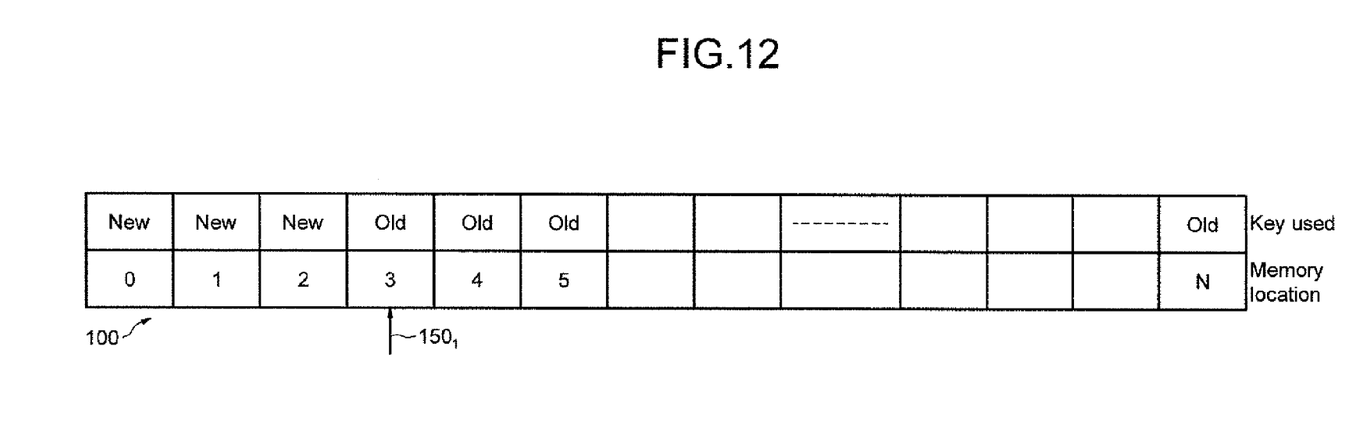
FIG. 12 is a diagram illustrating the local pointer has not moved during a time out period.
Figure 13:
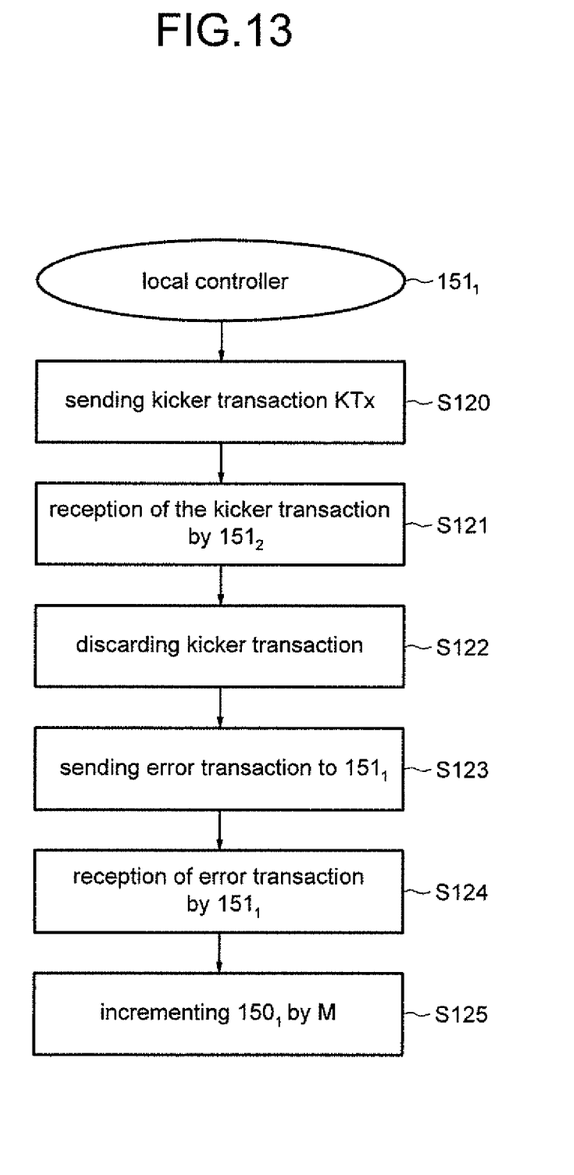
FIG. 13 is a flow diagram of receiving an error transaction.
Figure 14:
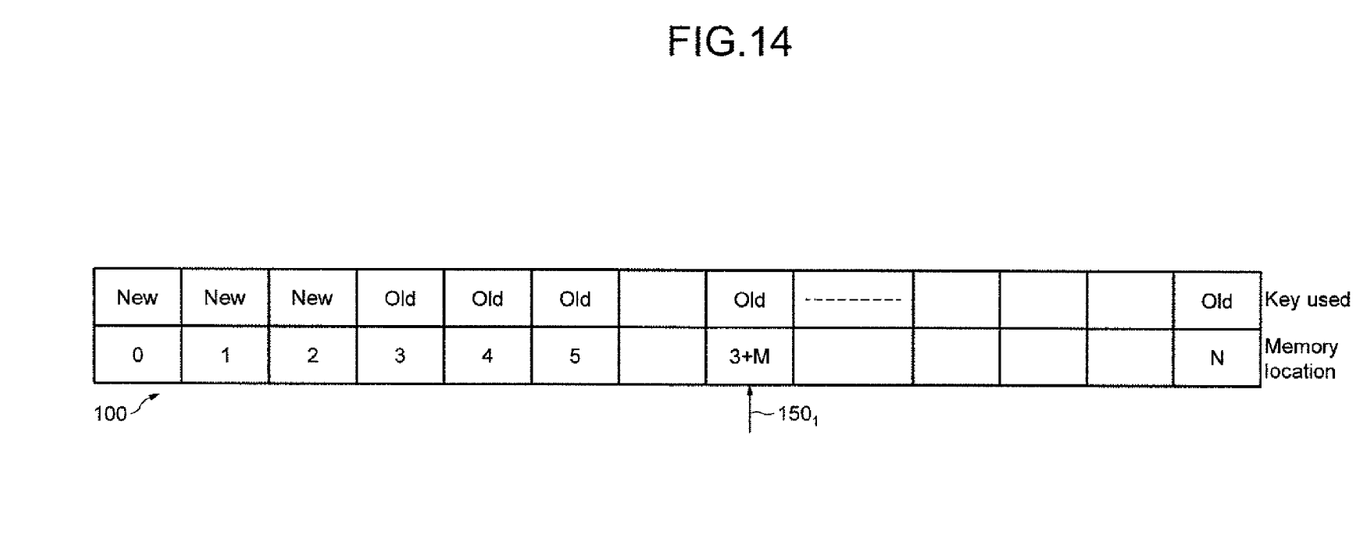
FIG. 14 is a diagram illustrating incrementing the local pointer by the address interleaving step size.

Assuming now with reference to FIGS. 12 to 14 that the kicker transaction Ktx initiated (S120 FIG. 13) by local controller $151_1$ of channel 1 (because pointer $150_1$ at memory location 3 has not moved during the time out period (FIG. 12)) has reached channel 2. In such a case, upon reception (S121) of this kicker transaction, the local controller $151_2$ of this channel 2 discards (S122) this kicker transaction and sends (S123) an error transaction to local controller $151_1$ which had initiated the kicker transaction.

Upon reception (S124) of this error transaction, the local pointer $150_1$ is incremented (S125) by the address interleaving step size M and points now at memory location 3+M. No written action is performed in memory location 3+M and the encryption key is not refreshed (FIG. 14).

The invention claimed is:

1. A method for managing an encrypted global interleaved memory space physically implemented according to an interleaving addressing scheme in encrypted memory banks of a plurality of memories respectively belonging to a plurality of channels, the encrypted global interleaved memory space being addressable with transactions through the interleaving addressing scheme for routing each transaction to a channel containing a physical memory location corresponding to a transaction address in accordance with the interleaving addressing scheme, and a range of addresses of an interleaved memory zone being equal to an address interleaving step, the method comprising:

providing each channel with a local address pointer configured to be incrementally moved along the encrypted global interleaved memory space each time the encrypted global interleaved memory space is addressed at a current address pointed by the local address pointer;

addressing the encrypted global interleaved memory space from the channel with a specific transaction at the current address in an absence of movement of the local address pointer during a time period;

re-encrypting data located at the current address with a new encryption key and incrementing the local address pointer to its next position upon reception at the channel of the specific transaction having been initiated by the channel; and if the specific transaction was initiated by another channel, discarding the specific transaction and sending an error transaction to that another channel, and incrementing a local address pointer of the another channel by the address interleaving step upon receiving the error transaction.

2. The method according to claim 1, further comprising:
encrypting data to be stored within a memory bank and decrypting data to be read from the memory bank and, upon reception at the channel of the specific transaction having been initiated by the channel
reading the data located at the current address and encrypted with a previous encryption key,
decrypting the encrypted data with the previous encryption key,
selecting a new primary key,
generating the new encryption key from at least the selected new primary key,
re-encrypting the decrypted data with the new encryption key, and
rewriting the re-encrypted data at the current address.

3. The method of claim 1, wherein said encrypted global interleaved memory space contains memory regions covering at least one memory zone, and further comprising upon reception of a transaction addressing a memory region:
assigning a region identification associated to the memory region; and
generating the new encryption key from at least a selected new key and the region identification.

4. A device comprising:
a plurality of channels;
an encrypted global interleaved memory space physically implemented according to an interleaving addressing scheme in encrypted memory banks of a plurality of memories respectively belonging to the plurality of channels, the encrypted global interleaved memory space being addressable with transactions through an address interleaving for routing each transaction to a channel containing a physical memory location corresponding to a transaction address in accordance with the interleaving addressing scheme, and a range of addresses of an interleaved memory zone being equal to an address interleaving step; and
each channel further comprising
a local address pointer configured to be incrementally moved along the encrypted global interleaved memory space each time the encrypted global interleaved memory space is addressed at a current address pointed by the local address pointer, a local controller configured to, in an absence of movement of the local address pointer during a time period, address the encrypted global interleaved memory space through the interleaving addressing scheme with a specific transaction at the current address, and upon reception of the specific transaction having been initiated by the local controller, control re-encrypting data located at the current address with a new encryption key and increment the local address pointer to its next position, and if the specific transaction was initiated by another channel, discarding the specific transaction and sending an error transaction to that another channel, and incrementing a local address pointer of the another channel by an address interleaving step upon receiving the error transaction.

5. The device according to claim 4, further comprising:

at least one master address decoder and a plurality of local address decoders respectively associated to the plurality of channels;

each address decoder configured to implement the address interleaving with the interleaving addressing scheme;

at least one master element configured to address the encrypted global interleaved memory space with transactions through the at least one master address decoder; and the local controller of the channel being configured to, in the absence of movement of the local address pointer of the channel during the time period, address the encrypted global interleaved memory space through the local address decoder associated to the channel with the specific transaction at the current address.

6. The device according to claim 4, wherein each channel further comprises a local encryptor/decryptor configured to encrypt data to be stored within a memory bank and to decrypt data to be read from a memory bank and the local controller is configured, upon reception at the channel of a specific transaction having been initiated by the local controller, to select a new primary key, control reading the data located at the current address and encrypted with a previous encryption key, control the encryptor/decryptor for decrypting the encrypted data with the previous encryption key, generating the new encryption key from at least the selected new primary key and re-encrypting the decrypted data with the new encryption key, and control rewriting the re-encrypted data at the current address.

7. The device according to claim 4, wherein the encrypted global interleaved memory space contains memory regions covering at least one memory zone, each local processor further comprising:

an address filter configured, upon reception of a transaction addressing a memory region, to assign a region identification associated to the memory region, and the local encryptor/decryptor is configured to generate the new encryption key from at least the selected new key and the region identification.

8. The device according to claim 4, further comprising a System on Chip including a local processor of each channel, master elements and a plurality of memory interfaces respectively coupled to the plurality of memories being outside of the System on Chip, a communication medium being a Network on Chip.

9. A device comprising:

a plurality of channels;

an encrypted global interleaved memory space physically implemented according to an interleaving addressing scheme in encrypted memory banks of a plurality of memories respectively belonging to the plurality of channels, the encrypted global interleaved memory space being addressable with transactions through an address interleaving for routing each transaction to a channel containing a physical memory location corresponding to a transaction address in accordance with the interleaving addressing scheme; and a local controller configured to, in an absence of movement of a local address pointer during a time period, address the encrypted global interleaved memory space through the interleaving addressing scheme with a specific transaction at a current address, and upon reception of the specific transaction having been initiated by the local controller, control re-encrypting data located at the current address with a new encryption key and increment the local address pointer to its next position, and if the specific transaction was initiated by another channel, discarding the specific transaction and sending an error transaction to that another channel, and incrementing a local address pointer of the another channel by an address interleaving step upon receiving the error transaction.

10. The device of claim 9, wherein each channel further comprising a local address pointer configured to be incrementally moved along the encrypted global interleaved memory space each time the encrypted global interleaved memory space is addressed at the current address pointed by the local address pointer.

* * * * *